United States Patent
Sakane et al.

(10) Patent No.: US 10,919,778 B2
(45) Date of Patent: *Feb. 16, 2021

(54) METHOD FOR PRODUCING IRON-BASED OXIDE MAGNETIC PARTICLE POWDER

(71) Applicant: DOWA ELECTRONICS MATERIALS CO., LTD., Tokyo (JP)

(72) Inventors: Kenji Sakane, Tokyo (JP); Tetsuya Kawahito, Tokyo (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 463 days.

This patent is subject to a terminal disclaimer.

(21) Appl. No.: 15/746,459

(22) PCT Filed: Jul. 26, 2016

(86) PCT No.: PCT/JP2016/071830
§ 371 (c)(1),
(2) Date: Jan. 22, 2018

(87) PCT Pub. No.: WO2017/018407
PCT Pub. Date: Feb. 2, 2017

(65) Prior Publication Data
US 2018/0208479 A1    Jul. 26, 2018

(30) Foreign Application Priority Data

Jul. 27, 2015  (JP) .................................. 2015-147381

(51) Int. Cl.
*C01G 49/00* (2006.01)
*H01F 1/11* (2006.01)
(Continued)

(52) U.S. Cl.
CPC ............ *C01G 49/00* (2013.01); *C01G 49/06* (2013.01); *G11B 5/70642* (2013.01);
(Continued)

(58) Field of Classification Search
CPC ........... C01G 49/0072; C01G 49/0063; C01G 49/0045; C01G 49/0018; C01G 49/06;
(Continued)

(56) References Cited

U.S. PATENT DOCUMENTS 10,504,548 B2 * 12/2019 Sakane .................. C01G 51/40
10,622,127 B2 *  4/2020 Sakane .............. C01G 49/0018

FOREIGN PATENT DOCUMENTS

JP        2006-306707        11/2006
JP        2008-174405         7/2008
(Continued)

*Primary Examiner* — C Melissa Koslow
(74) *Attorney, Agent, or Firm* — Clark & Brody LP

(57) ABSTRACT

A method for making iron-based oxide magnetic particle powders having particular peak intensity and diffraction intensities, comprising neutralizing an aqueous solution containing a trivalent iron ion, alone or with a substituting metal (M), a step of adding hydroxycarboxylic acid to the neutralized solution to create a second solution including the hydroxycarboxylic acid D, another neutralizing step for the second solution, a coating step of silicon oxide coating iron oxyhydroxide with or without the substituted metal element found in the second neutralized solution, and heating the coated iron oxyhydroxide with or without the substituted metal element to form a silicon oxide coated iron oxide with or without the substituted metal element. After the second neutralization step, there is no water washing. As a result, the molar ratio D/(Fe+M) is between 0.125 and 1.0 and the silicon oxide coating can be uniform and the formation reaction of the hydroxide is not retarded.

7 Claims, 7 Drawing Sheets

(51) Int. Cl.
    *G11B 5/706*     (2006.01)
    *C01G 49/06*     (2006.01)
    *G11B 5/714*     (2006.01)

(52) U.S. Cl.
    CPC ............... G11B 5/714 (2013.01); H01F 1/11 (2013.01); *C01P 2002/50* (2013.01); *C01P 2002/52* (2013.01); *C01P 2002/72* (2013.01); *C01P 2004/04* (2013.01); *C01P 2004/64* (2013.01); *C01P 2006/42* (2013.01)

(58) Field of Classification Search
    CPC ............ C01D 2004/64; C01D 2003/50; C01D 2003/72; C01D 2003/52; C01D 2006/42
    See application file for complete search history.

(56) References Cited

FOREIGN PATENT DOCUMENTS

| | | |
|---|---|---|
| JP | 2009-206476 | 9/2009 |
| JP | 2009-224414 | 10/2009 |
| JP | 2014-216034 | 11/2014 |
| JP | 2014-224027 | 12/2014 |
| JP | 2015-032760 | 2/2015 |
| WO | 2007/114455 | 10/2007 |
| WO | 2008/029861 | 3/2008 |
| WO | 2008/149785 | 12/2008 |
| WO | 2016/047559 | 3/2016 |
| WO | 2016/111224 | 7/2016 |

\* cited by examiner

[Fig.1]
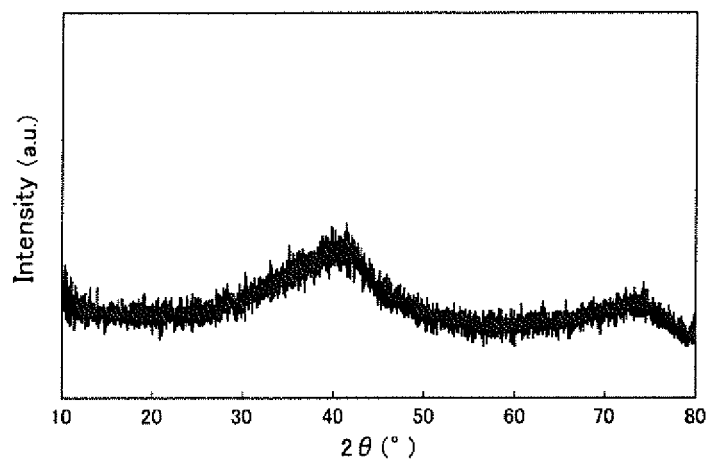
[Fig.2]
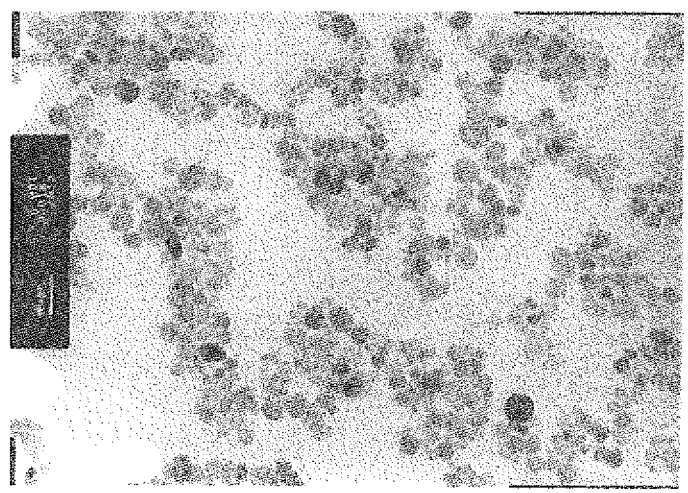

[Fig.3]
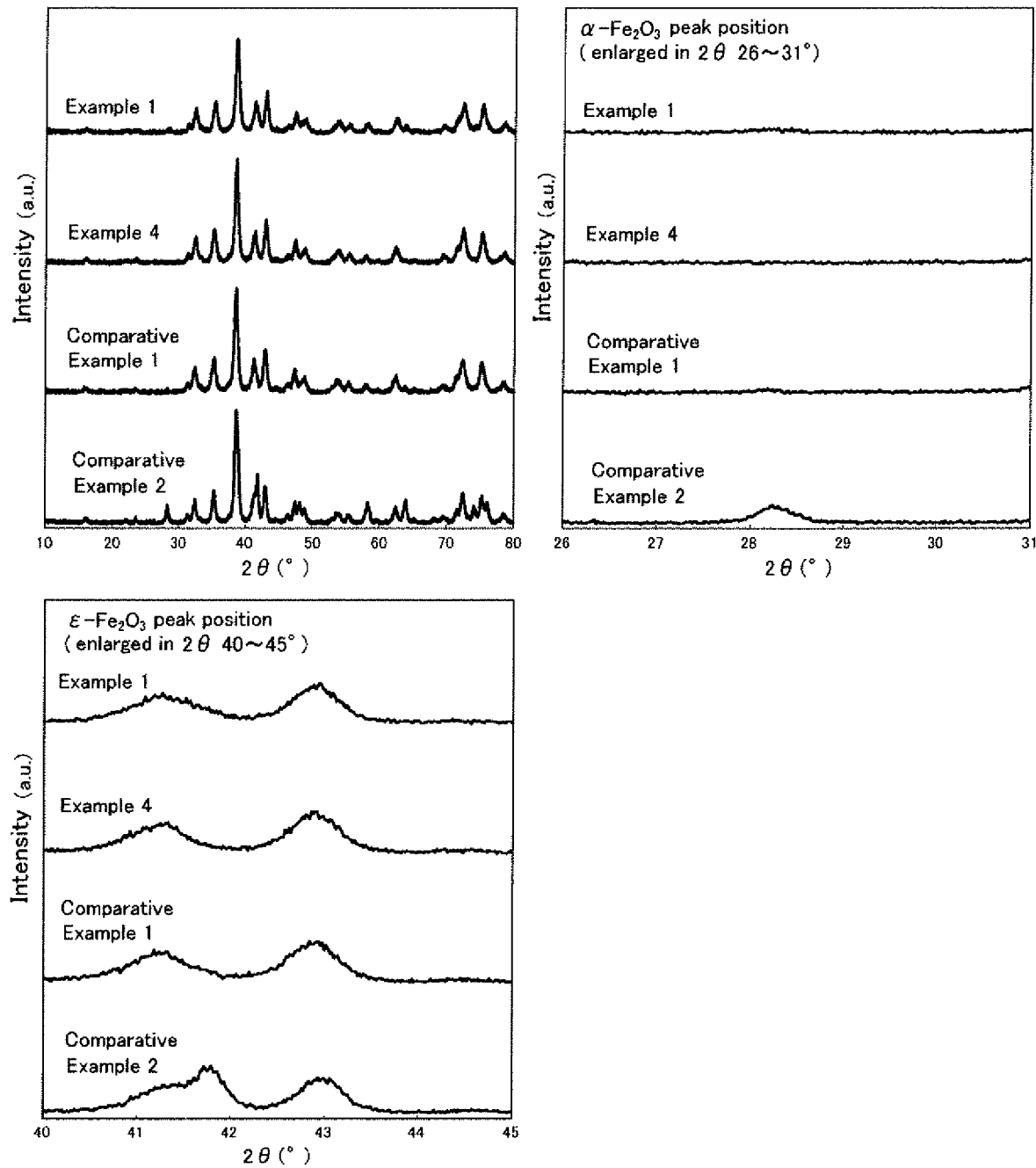

[Fig.4]
(a) B-H curve
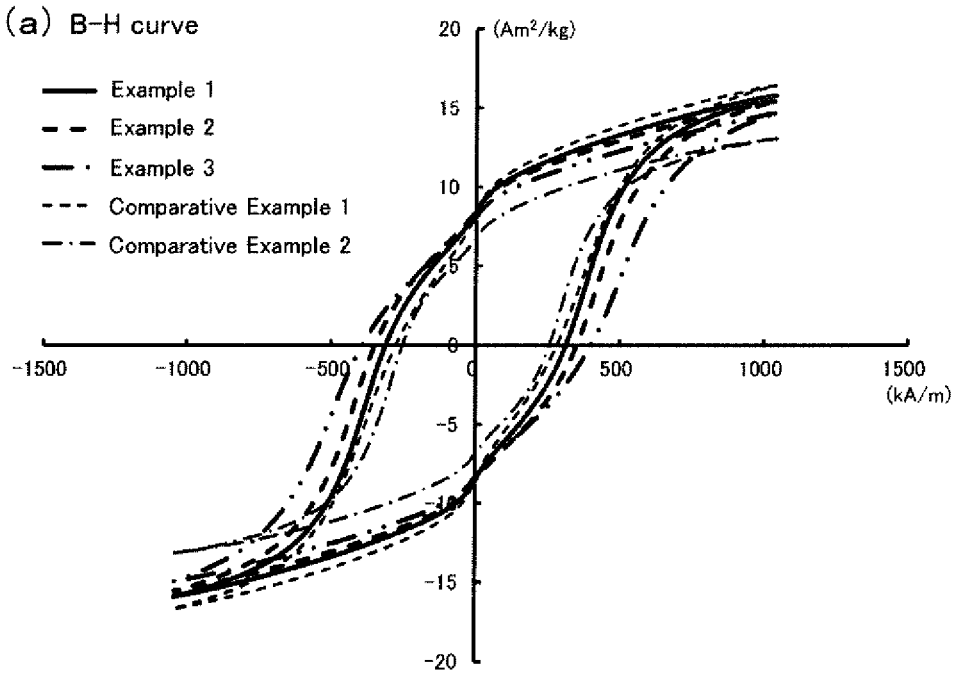
(b) Differential B-H curve
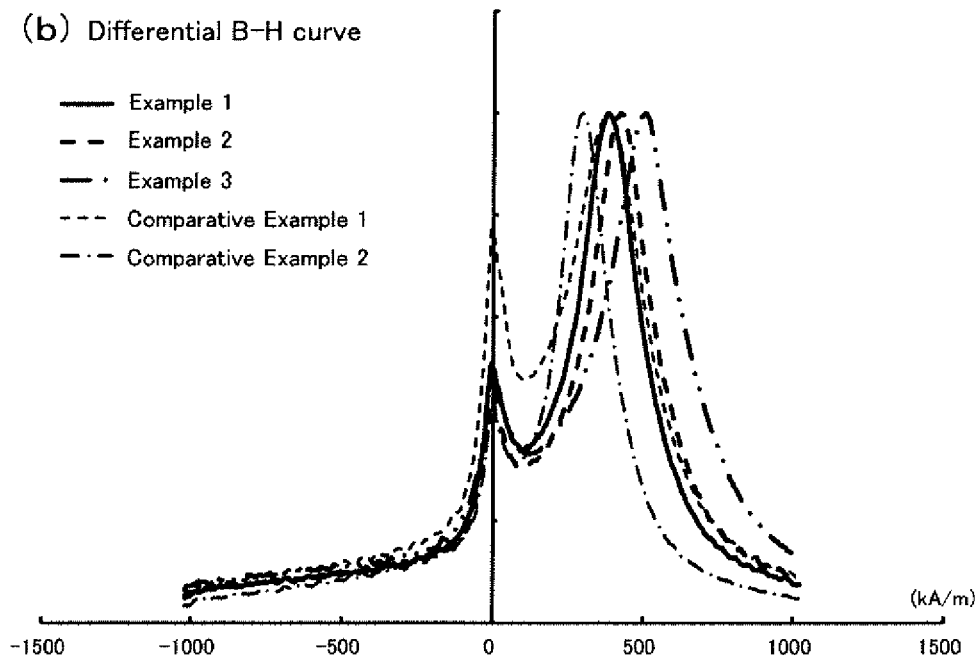

[Fig.5]
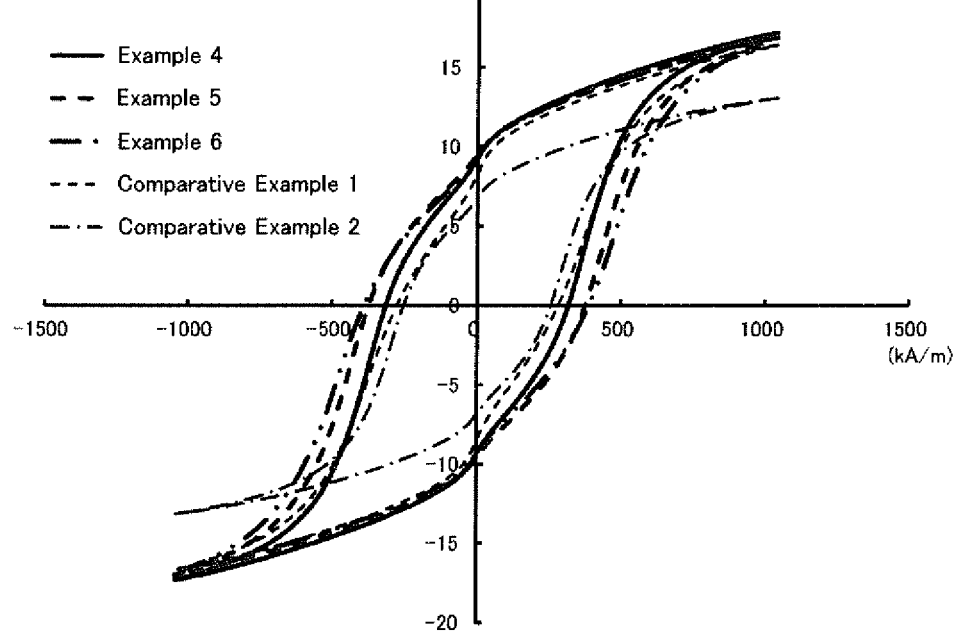
(a) B-H curve
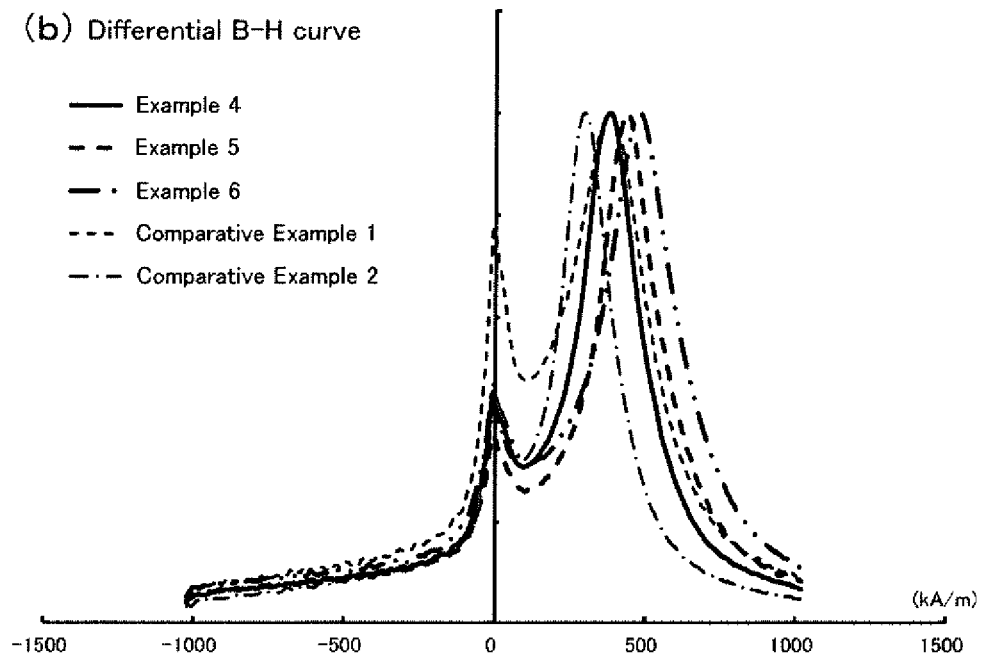
(b) Differential B-H curve

[Fig.6]
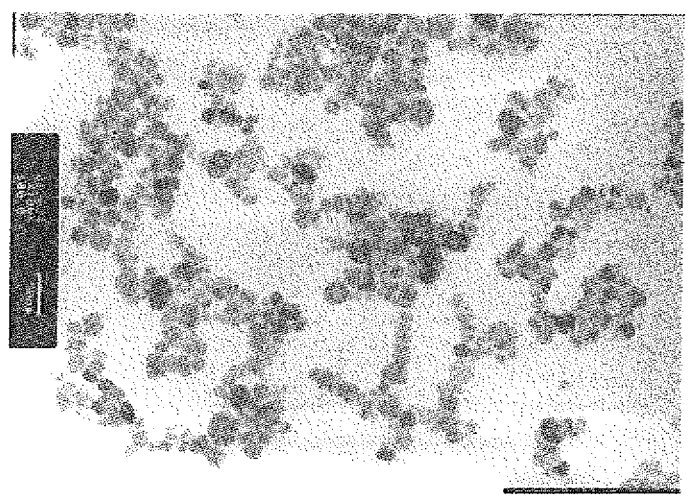

[Fig.7]
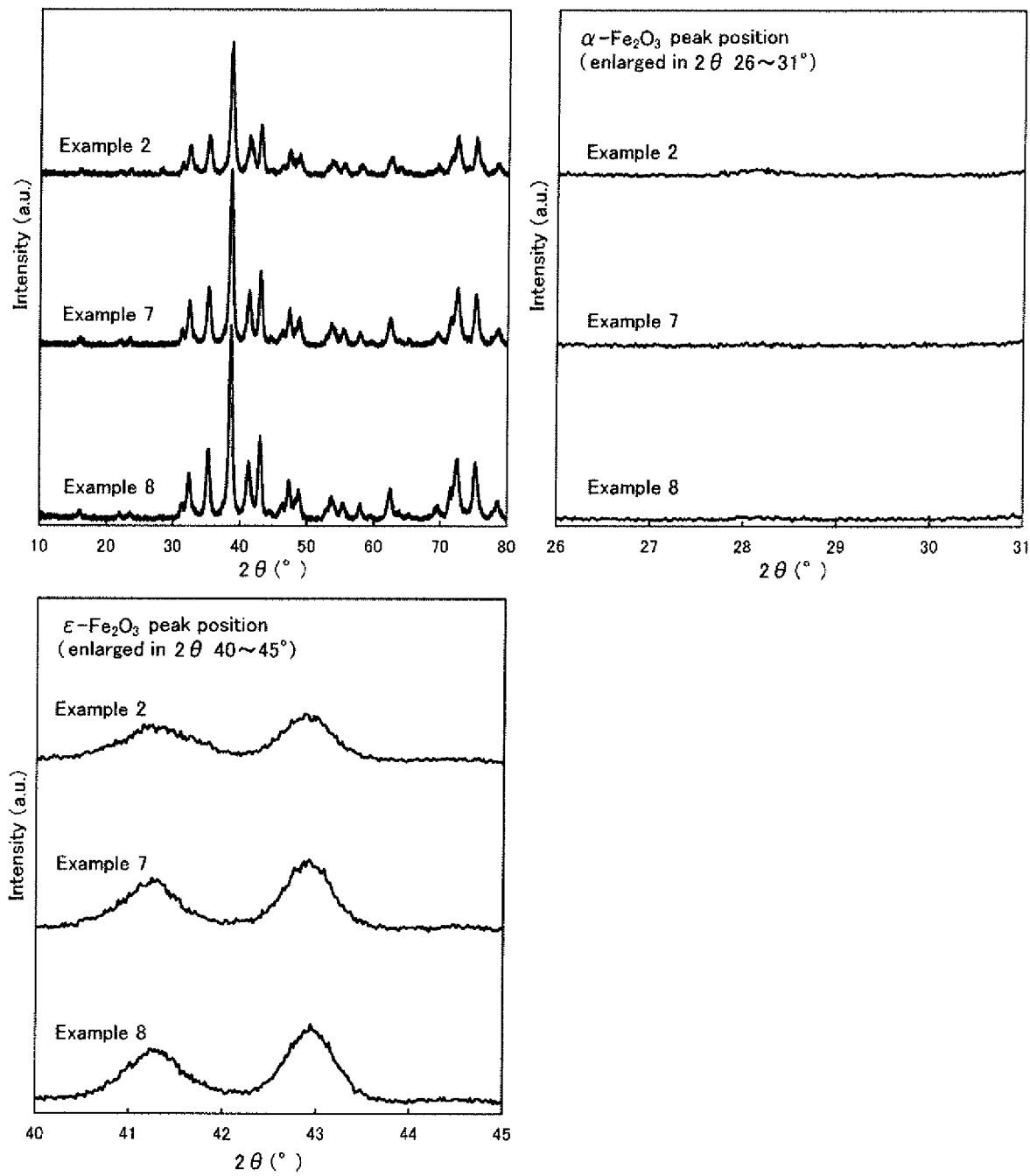

[Fig.8]
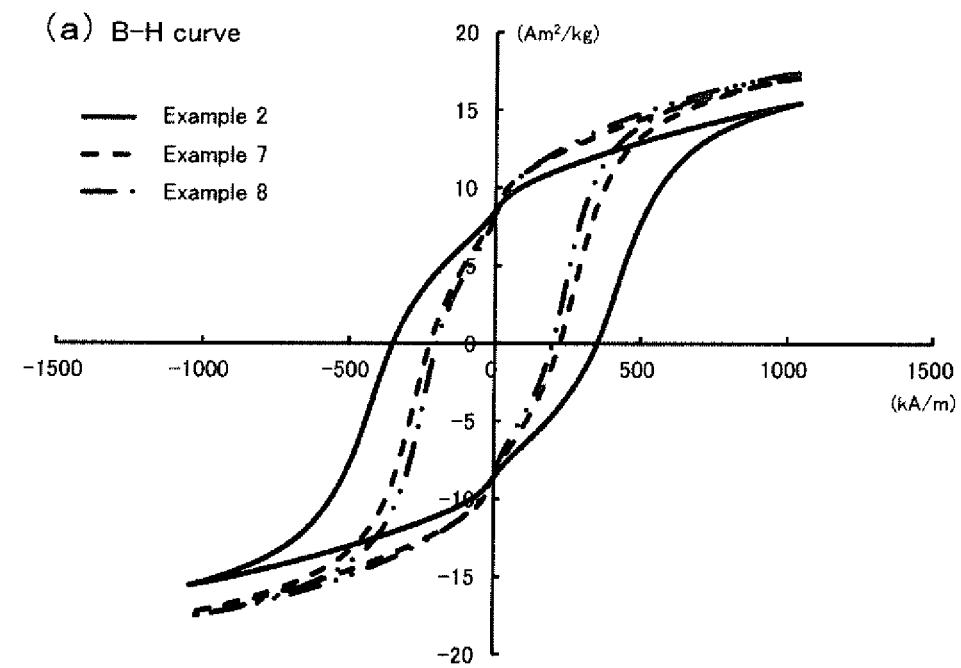
(a) B-H curve
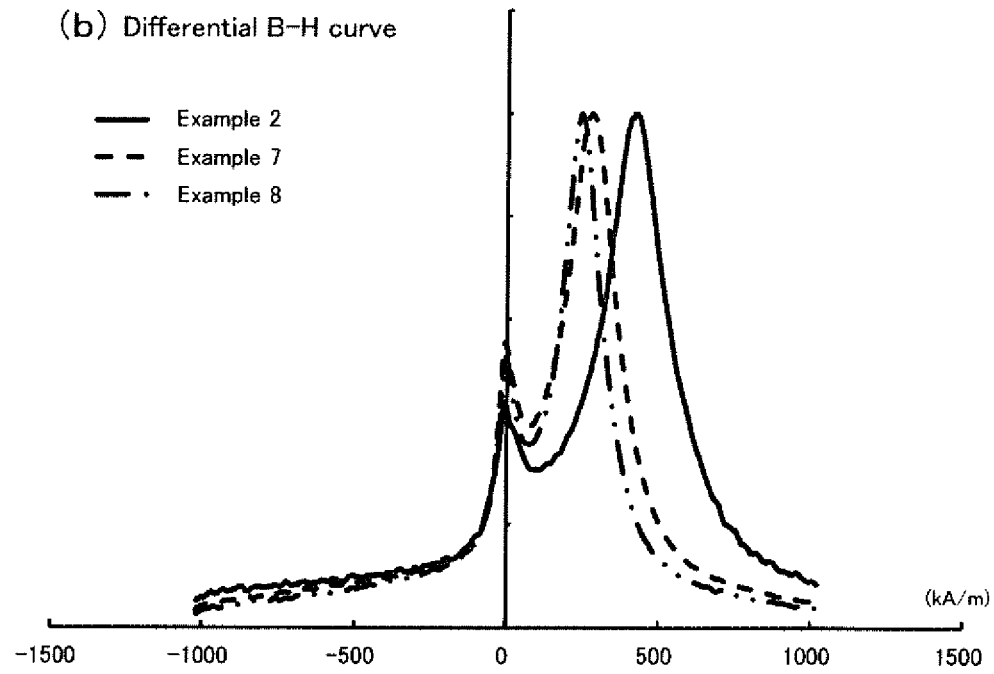
(b) Differential B-H curve

METHOD FOR PRODUCING IRON-BASED OXIDE MAGNETIC PARTICLE POWDER

TECHNICAL FIELD

The present invention relates to a method for producing an iron-based oxide magnetic particle powder that is suitable for a high density magnetic recording medium, a radio wave absorber, and the like, particularly to the particle powder that has an average particle diameter of particles in nanometer order.

BACKGROUND ART

While $\varepsilon$-$Fe_2O_3$ is an extremely rare phase among iron oxides, particles thereof having a nanometer order size show a great coercive force (Hc) of approximately 20 kOe (1.59× $10^6$ A/m) at room temperature, and thus a production method for synthesizing $\varepsilon$-$Fe_2O_3$ as a single phase has been investigated (PTL 1). In the case where $\varepsilon$-$Fe_2O_3$ is used in a magnetic recording medium, there is no material in the current situation for a magnetic head having a high-level saturation magnetic flux density corresponding thereto, and thus the adjustment of the coercive force is performed by substituting part of Fe sites of $\varepsilon$-$Fe_2O_3$ by a trivalent metal, such as Al, Ga, and In, and the relationship between the coercive force and the radio wave absorption characteristics is also investigated (PTL 2).

In the field of magnetic recording, development of a magnetic recording medium having a high carrier to noise ratio (C/N ratio) of the reproduced signal level and the particulate noise has been performed, and for increasing the recording density, the magnetic particles constituting the magnetic recording layer are demanded to be refined. However, the refinement of the magnetic particles generally tends to cause deterioration of the environmental stability and the thermal stability thereof, which raises concerns about the deterioration of the magnetic characteristics of the magnetic particles under the use or storage environment, and accordingly, various partially substituted materials of $\varepsilon$-$Fe_2O_3$ represented by the general formula $\varepsilon$-$A_xB_yFe_{2-x-y}O_3$ or $\varepsilon$-$A_xB_yC_zFe_{2-x-y-z}O_3$ (wherein A represents a divalent metal element, such as Co, Ni, Mn, and Zn; B represents a tetravalent metal atom, such as Ti; and C represents a trivalent metal element, such as Ga and Al) that have a reduced particle size and a variable coercive force and are excellent in environmental stability and thermal stability, by substituting a part of Fe sites of $\varepsilon$-$Fe_2O_3$ by another metal that is excellent in heat resistance have been developed (PTL 3).

$\varepsilon$-$Fe_2O_3$ is not a thermodynamically stable phase, and therefore the production thereof requires a special method. PTLs 1 to 3 shown above describe such a production method of $\varepsilon$-$Fe_2O_3$ that fine crystals of iron oxyhydroxide formed by a liquid phase method are used as a precursor, and the precursor is coated with a silicon oxide by a sol-gel method and then subjected to a heat treatment, and as the liquid phase method, a reverse micelle method using an organic solvent as the reaction medium, and a method using only an aqueous solution as the reaction medium are described respectively.

CITATION LIST

Patent Literatures

PTL 1: JP-A-2008-174405
PTL 2: WO 2008/029861
PTL 3: WO 2008/149785

SUMMARY OF INVENTION

Technical Problem

The $\varepsilon$-$Fe_2O_3$ or the $\varepsilon$-type iron-based oxide obtained by substituting a part of Fe produced by the ordinary methods described in PTLs 1 to 3 has excellent magnetic characteristics, but may cause fluctuation in the coercive force distribution observed in some cases depending on the production conditions. As a result of earnest investigations made by the present inventors, it has been found that the $\varepsilon$-$Fe_2O_3$ and the $\varepsilon$-type iron-based oxide obtained by substituting a part of Fe produced by the ordinary methods have a broad particle size distribution and contain considerable amounts of particles that are extremely finer than the average particle diameter, and the fine particles have a small coercive force, and in the use thereof in a magnetic recording medium, do not contribute to the enhancement of the recording density.

Specifically, the curve obtained by numerical differentiation of the magnetic hysteresis curve (B-H curve) (which is hereinafter referred to as a differential B-H curve) measured for magnetic powder obtained by the ordinary methods has two peaks observed therein. It is considered that the magnetic powder corresponding to the peak appearing at a position with a higher applied magnetic field in these peaks, i.e., corresponding to the high Hc component, contributes to magnetic recording, but the magnetic powder corresponding to the peak appearing at a position with a lower applied magnetic field, i.e., corresponding to the low Hc component, does not contribute to magnetic recording. As a result of investigations by the inventors, it has been confirmed that when the content of the aforementioned fine particles is decreased, the peak of the low He component in the differential B-H curve is lowered.

The mechanism of the low Hc of the fine particles is unclear at the present time, but is expected to be a heterogeneous phase of $\varepsilon$-type iron-based oxide, e.g., $\alpha$-type iron-based oxide and $\gamma$-type iron-based oxide, contained, or superparamagnetism due to the small particle diameter.

It has been found that in any case, the fine particles do not contribute to the enhancement of the magnetic characteristics of the iron-based oxide magnetic particle powder, and the content thereof is necessarily decreased. Accordingly, a technical problem to be solved by the invention is to provide a method for producing an iron-based oxide magnetic particle powder that has a narrow particle size distribution and particularly a small content of the fine particles as a low Hc component, which result in a narrow coercive force distribution, and is suitable for the enhancement of the recording density of the magnetic recording medium.

Solution to Problem

As described above, PTLs 1 to 3 describe the method using an organic solvent and the method using only water as a reaction solvent, as a production method of iron oxyhydroxide (including partially substituted materials) as a precursor of the $\varepsilon$-$Fe_2O_3$ or the $\varepsilon$-type iron-based oxide obtained by substituting a part of Fe, and from the standpoint of economic efficiency, the precursor is preferably synthesized with an aqueous solution system without the use of an expensive organic solvent. In the case where iron oxide or iron oxyhydroxide is synthesized in an aqueous solution with $Fe^{3+}$ ion as a starting substance, it has been known that the crystal system thereof varies depending on the coexisting anion species, as described, for example, in "Synthesis of Schwertmannite and various anion substitution products by coprecipitation method, Function of anion in formation of FeOOH minerals", Atsuyuki INOUE and Tamao HATTA, Nendo Kagaku (Journal of the Clay Science Society of Japan), vol. 45, No. 4, pp. 250-265 (2006).

In the production method of the ε-Fe$_2$O$_3$ or the ε-type iron-based oxide obtained by substituting a part of Fe, the reason why iron oxyhydroxide (including partially substituted materials) as the precursor is coated with a silicon oxide before the heat treatment is to place the precursor in a kind of a constrained state, so as to prevent the crystal lattice from undergoing free deformation in the heat treatment, thereby producing a thermodynamically unstable phase. Therefore, it is considered that the crystal structure of the ε-Fe$_2$O$_3$ particles finally obtained is influenced by the crystal structure of the precursor particles.

As a result of investigations by the inventors based on the aforementioned consideration, it has been found that in the case where the production of the precursor is performed once through a state of hydroxide colloid of Fe$^{3+}$, the particle size distribution of the precursor particles is narrowed, and the effect is strengthened by the presence of a hydroxycarboxylic acid stabilizing the hydroxide colloid. It has also been found that in the case where the molar ratio of the hydroxycarboxylic acid to the trivalent iron ion as a starting substance in the reaction solution or the molar ratio of the hydroxycarboxylic acid to the total amount of the trivalent iron ion and the ion of the metal M substituting a part of Fe therein is changed, the dispersion state of the slurry containing the precursor formed through neutralization reaction is changed, and in the case where the precursor forming reaction is performed at a low temperature, the formation of α-type oxide, which is a heterogeneous phase of ε-type iron-based oxide, is suppressed. It has been also found that in the case where the precursor contains iron oxyhydroxide having the same crystal structure as ferrihydrite (Fe$_5$O$_7$ (OH)·4H$_2$O), or a compound obtained by substituting a part of Fe element thereof, the coercive force distribution of the iron-based oxide magnetic particle powder finally obtained is narrowed.

The inventors have completed the invention described below based on the aforementioned knowledge.

The composition of ferrihydrite shown in parentheses above is the ideal composition, and the actual composition thereof includes a certain fluctuation.

For solving the problems, the invention provides: a method for producing an iron-based oxide magnetic particle powder containing ε-Fe$_2$O$_3$, or ε-Fe$_2$O$_3$, a part of Fe sites of which is substituted by another metal element M, having an average particle diameter measured with a transmission electron microscope of 10 nm or more and 30 nm or less, the iron-based oxide magnetic particle powder having a value of I$_L$/I$_H$ calculated with I$_L$ and I$_H$ according to the following definitions of 0.7 or less, and a value of α$_s$/ε$_s$ according to the following definition of 0.5 or less, and preferably 0.1 or less.

Herein, I$_H$ represents an intensity of a peak present on a high magnetic field side in a differential B-H curve obtained by numerical differentiation of a B-H curve obtained by measuring under conditions of an applied magnetic field of 1,035 kA/m (13 kOe), an M measurement range of 0.005 A·m$^2$ (5 emu), a step bit of 80 bit, a time constant of 0.03 sec, and a wait time of 0.1 sec, and I$_L$ represents an intensity of an intercept of an ordinate at zero magnetic field in the differential B-H curve.

α$_s$ represents a maximum value of a diffraction intensity except for background in X-ray diffractometry at 2θ of 27.2° or more and 29.7° or less, and ε$_s$ represents a maximum value of a diffraction intensity except for background in X-ray diffractometry at 2θ of 42° or more and 44° or less.

In the production method provided, specifically, an aqueous solution containing a trivalent iron ion as a starting substance, or containing a trivalent iron ion and an ion of the metal M substituting a part of Fe sites is used; an alkali is added to the aqueous solution preferably retained at a temperature of 60° C. or less to neutralize the aqueous solution to pH of 1.0 or more and 3.0 or less; a hydroxycarboxylic acid D, preferably one or more selected from tartaric acid, citric acid, and malic acid, is added in an amount providing a molar ratio with respect to the amount of the trivalent iron ion (referred to as D/Fe) in the case where the substituting metal ion is not contained, or a molar ratio with respect to the total amount of the trivalent iron ion and the ion of the metal M (referred to as D/(Fe+M)) in the case where the substituting metal ion is contained of 0.125 or more and 1.0 or less; an alkali is further added to neutralize to pH of 7.0 or more and 10.0 or less; and then the iron oxyhydroxide or the iron oxyhydroxide containing the substituting metal element is coated with a silicon oxide and heated, so as to provide iron oxide or iron oxide containing the substituting metal element coated with a silicon oxide.

The invention also provides the method for producing iron-based oxide magnetic particle powder, in which the first neutralizing step, the step of adding a hydroxycarboxylic acid, and the second neutralizing step are performed at a temperature retained at 5° C. or more and 25° C. or less, for controlling the value of α$_s$/ε$_s$ to 0.1 or less.

In the production method, the iron-based oxide magnetic particle powder coated with a silicon oxide is obtained, and the silicon oxide coating may be removed depending on purposes.

The iron-based oxide is preferably ε-A$_x$B$_y$C$_z$Fe$_{2-x-y-z}$O$_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and 0≤x, y, z<1). In the case where all x, y, and z are 0, ε-Fe$_2$O$_3$ containing no substituting element is provided.

Advantageous Effects of Invention

By using the production method of the invention, an iron-based oxide magnetic particle powder can be provided that has a narrow particle size distribution and particularly a small content of the fine particles that do not contribute to the enhancement of the magnetic recording characteristics, which result in a narrow coercive force distribution, and is suitable for the enhancement of the recording density of the magnetic recording medium.

BRIEF DESCRIPTION OF DRAWINGS

FIG. 1 shows the X-ray diffraction pattern of the precursor in Example 1.

FIG. 2 shows the TEM micrograph of the iron-based oxide magnetic particle powder obtained in Example 1.

FIG. 3 shows the X-ray diffraction patterns of the iron-based oxide magnetic particle powder obtained in Example 1, Example 4, Comparative Example 1, and Comparative Example 2.

FIG. 4 shows the B-H curves (a) and the differential B-H curves (b) of the iron-based oxide magnetic particle powder obtained in Example 1, Example 2, Example 3, Comparative Example 1, and Comparative Example 2.

FIG. 5 shows the B-H curves (a) and the differential B-H curves (b) of the iron-based oxide magnetic particle powder obtained in Example 4, Example 5, Example 6, Comparative Example 1, and Comparative Example 2.

FIG. 6 shows the TEM micrograph of the iron-based oxide magnetic particle powder obtained in Example 7.

FIG. 7 shows the X-ray diffraction patterns of the iron-based oxide magnetic particle powder obtained in Example 2, Example 7, and Example 8.

FIG. 8 shows the B-H curves (a) and the differential B-H curves (b) of the iron-based oxide magnetic particle powder obtained in Example 2, Example 7, and Example 8.

DESCRIPTION OF EMBODIMENTS

Iron-Based Oxide Magnetic Particles

The production method of the invention is to produce an iron-based oxide magnetic particle powder containing $\epsilon\text{-Fe}_2O_3$, or $\epsilon\text{-Fe}_2O_3$, apart of Fe sites of which is substituted by another metal element, and includes the case where a heterogeneous phase (which mainly contains an α-type iron-based oxide) as unavoidable impurities due to the production method thereof is contained in addition to the magnetic particle powder.

The presence of an s-structure in the partially substituted material obtained by substituting a part of Fe sites of $\epsilon\text{-Fe}_2O_3$ by another metal element can be confirmed by using X-ray diffractometry (XRD), high energy electron diffractometry (HEED), or the like.

Examples of the $\epsilon\text{-Fe}_2O_3$ or the partially substituted materials thereof capable of being produced by the production method of the invention include the following.

Material represented by the general formula $\epsilon\text{-Fe}_2O_3$ containing no substituting element Material represented by the general formula $\epsilon\text{-C}_z\text{Fe}_{2-z}O_3$ (wherein C represents at least one trivalent metal element selected from In, Ga, and Al)

Material represented by the general formula $\epsilon\text{-A}_x\text{B}_y\text{Fe}_{2-x-y}O_3$ (wherein A represents at least one divalent metal element selected from Co, Ni, Mn, and Zn; and B represents at least one tetravalent metal element selected from Ti and Sn)

Material represented by the general formula $\epsilon\text{-A}_x\text{C}_z\text{Fe}_{2-x-z}O_3$ (wherein A represents at least one divalent metal element selected from Co, Ni, Mn, and Zn; and C represents at least one trivalent metal element selected from In, Ga, and Al)

Material represented by the general formula $\epsilon\text{-B}_y\text{C}_z\text{Fe}_{2-y-z}O_3$ (wherein B represents at least one tetravalent metal element selected from Ti and Sn; and C represents at least one trivalent metal element selected from In, Ga, and Al)

Material represented by the general formula $\epsilon\text{-A}_x\text{B}_y\text{C}_z\text{Fe}_{2-x-y-z}O_3$ (wherein A represents at least one divalent metal element selected from Co, Ni, Mn, and Zn; B represents at least one tetravalent metal element selected from Ti and Sn; and C represents at least one trivalent metal element selected from In, Ga, and Al)

The material of the type that is substituted by only the C element can be arbitrarily controlled for the coercive force of the magnetic particles, and also has an advantage that the same space group as $\epsilon\text{-Fe}_2O_3$ can be easily obtained, but is slightly inferior in thermal stability, and therefore the material is preferably substituted simultaneously by the A or B element.

The material of the type that is substituted by the two elements A and B is excellent in thermal stability and can retain the high coercive force of the magnetic particles at ordinary temperature, but is slightly difficult to have the same space group as $\epsilon\text{-Fe}_2O_3$.

The material of the three-element substituted type that is substituted by the elements A, B, and C is best balanced among the aforementioned characteristics, and is most preferred since the material is excellent in heat resistance, easiness in providing a single phase, and controllability of the coercive force. The production method of the invention can be applied to the iron-based oxide magnetic particles of $\epsilon\text{-Fe}_2O_3$ containing no substituting element and all the substituting types.

In the case where only the element C is substituted, a value of $0<z<1$ is allowed, but in consideration of the writing capability of the magnetic heads at the present time and in the near future, the coercive force is necessarily adjusted, and thus a value of $0.15 \leq z \leq 0.60$ is preferred.

In the case where the element A or B is substituted along with the element C, the element B is preferably substituted since the value of is lowered while the mechanism thereof is unclear at the present time. In this case, values of $0<y<1$ and $0<z<1$ are allowed, but a value of $0.15 \leq z \leq 0.60$ is preferred for z due to the same reason as above, and a value of $0<y \leq 0.1$ is preferred, and a value of $0.001 \leq y \leq 0.1$ is more preferred, for y for retaining the high saturation magnetization $\sigma_s$.

In the three-element substituted material containing the element A in addition to the elements C and B, the element A is preferably added in such an extent that does not deteriorate $I_L/I_H$, and thereby the saturation magnetization $\sigma_s$ can be further improved.

In the three-element substituted material, the preferred ranges of the substituting amounts x, y, and z are as follows.

x and y may be in arbitrary ranges in $0<x<1$ and $0<y<1$, and are preferably in ranges of $0.01 \leq x \leq 0.2$ and $0.01 \leq y \leq 0.2$ since the coercive force of the magnetic particles of the three-element substituted material is necessarily changed from that of $\epsilon\text{-Fe}_2O_3$ in consideration of the application to magnetic recording. z may also be in a range of $0<z<1$ as similar to x and y, and is preferably in a range of $0<z \leq 0.5$ from the standpoint of the control of the coercive force and the easiness in providing a single phase.

The magnetic particles having a part of Fe sites substituted obtained by the production method of the invention can retain a high coercive force at ordinary temperature by suitably controlling the value of y or the values of x and y, and the coercive force can be controlled to a desired value by controlling x, y, and z.

Average Particle Diameter

The magnetic particles obtained by the production method of the invention are preferably fine to such an extent that the particles each form a single magnetic domain structure. The average particle diameter thereof measured with a transmission electron microscope is preferably 30 nm or less, and more preferably 20 nm or less. However, when the average particle diameter is too small, the proportion of fine particles that do not contribute to the aforementioned enhancement of the magnetic characteristics may be increased to deteriorate the magnetic characteristics per unit weight of the magnetic particles, and thus the average particle diameter is preferably 10 nm or more.

Starting Substance and Precursor

In the production method of the invention, as a starting substance of the iron-based oxide magnetic particle powder, an acidic aqueous solution containing a trivalent iron ion, or a trivalent iron ion and an ion of a metal element that finally substitutes the Fe sites (which may be hereinafter referred to as a raw material solution) is used. The supply sources of the iron ion and the metal ion of the substituting element each are preferably a water soluble inorganic salt, such as a nitrate, a sulfate, and a chloride, from the standpoint of the availability and the cost. When the metal salt is dissolved in water, the metal ion is dissociated, and the aqueous solution exhibits acidity. When an alkali is added to the acidic aqueous solution containing the metal ions for neutralization, iron oxyhydroxide, a mixture of iron oxyhydroxide and an oxyhydroxide of the substituting element, or iron oxyhydroxide, a part of Fe sites of which is substituted by another metal element, is obtained. In the production method of the invention, the iron oxyhydroxide, the mixture of iron oxyhydroxide and an oxyhydroxide of the substituting element, or the iron oxyhydroxide, a part of Fe sites of which is substituted by another metal element, is used as a precursor of the iron-based oxide magnetic particle powder.

The total metal ion concentration in the raw material solution is not particularly determined in the invention, and is preferably 0.01 mol/L or more and 0.5 mol/L or less. The concentration of less than 0.01 mol/L is not economically preferred since the amount of the iron-based oxide magnetic particle powder that is obtained by one time of the reaction may be decreased. The total metal ion concentration that exceeds 0.5 mol/L is not preferred since the reaction solution tends to be gelled due to the rapid formation of the precipitate of the hydroxide.

In general, it has been known that the crystal structure of iron oxyhydroxide formed through a liquid phase method varies depending on the anion species present in the aqueous solution and the neutralization condition. As a result of the investigations by the inventors, it has been found that an $\varepsilon$-type iron-based oxide can be easily obtained finally in the case where iron oxyhydroxide as the precursor of the iron-based oxide magnetic particle powder contains one having a ferrihydrite structure.

The reason why an $\varepsilon$-type iron-based oxide can be easily obtained when the production thereof is performed through the oxyhydroxide having a ferrihydrite structure is not unclear at the present time, and it is expected that ferrihydrite has a structure having many defects, in which layers having a hexagonal closest packing arrangement and a cubic hexagonal closest packing arrangement of $O^{2-}$ and $OH^-$ are irregularly laminated, lacking apart of the Fe octahedron, and in the case where the structure is subjected to a heat treatment under the restricted condition with a silicon oxide covering the structure, the structure can be easily converted to the $\varepsilon$-type iron-based oxide. It is also expected that in the case where another metal element other than Fe is added for substituting a part of Fe sites of $\varepsilon$-$Fe_2O_3$ by the metal element, coprecipitation with Fe is liable to occur, and a heterogeneous phase other than ferrihydrite is difficult to be formed, which are preferred from the standpoint of the compositional uniformity and the particle uniformity.

Ferrihydrite includes two structures referred to as 6-line (6L) and 2-line (2L), and ferrihydrite having a 2L structure is easily converted to the $\varepsilon$-type iron-based oxide, as compared to ferrihydrite having a 6L structure.

First Neutralizing Step

In the production method of the invention, an alkali is added to the raw material solution to neutralize the solution until the pH thereof becomes 1.0 or more and 3.0 or less. The alkali used for neutralization may be any of a hydroxide of an alkali metal or an alkaline earth metal, aqueous ammonia, and an ammonium salt, such as ammonium hydrogen carbonate, and aqueous ammonia and ammonium hydrogen carbonate are preferably used since these compounds are difficult to remain finally as an impurity after the formation of the $\varepsilon$-type iron-based oxide through the heat treatment. The alkali may be added in the form of a solid to the aqueous solution of the starting substances, and is preferably added in the form of an aqueous solution thereto from the standpoint of ensuring the uniformity of the reaction.

When the alkali is added to the raw material solution to increase the pH to the aforementioned range, a precipitate of a hydroxide of trivalent iron is precipitated, and during the neutralization treatment, the reaction solution is stirred with a known mechanical measure. Since the formation of the precipitate is in a kind of an overshoot state, the precipitate is deflocculated by retaining the pH under stirring the reaction solution, and then the reaction solution becomes clear. While the period of time required for the retention varies depending on the metal ion concentration of the raw material solution and the addition rate of the alkali, the reaction solution is retained until the solution becomes a clear state. In this state, a part of iron in the reaction solution forms a hydroxide colloid, whereas the balance thereof is dissolved as a soluble iron ion, and it is expected that the hydroxide colloid of iron becomes nuclei of the formation of the precursor in the second neutralizing step.

In the production method of the invention, it is considered that the iron-based oxide magnetic particle powder having a narrow average particle diameter distribution is obtained since the dispersibility of the hydroxide colloid of iron formed in this step is better than that of the precipitate of the hydroxide before the deflocculation.

In this step, the pH of less than 1.0 after the neutralization is not preferred since the hydroxide colloid of iron may be further dissolved as a soluble iron ion. The pH that exceeds 3.0 after the neutralization is also not preferred since the precipitate of the hydroxide of iron tends to remain.

A hydroxide of iron can be in the form of an oxyhydroxide or a hydroxide depending on the pH of the system and the like, and in the description herein, the term "hydroxide" is used as a concept including an oxyhydroxide.

In the production method of the invention, the reaction temperature in the neutralization treatment is not particularly limited, and is preferably 60° C. or less. The reaction temperature that exceeds 60° C. is not preferred since ferrihydrite 6L is formed to facilitate the formation of a heterogeneous phase (a phase). By performing the first neutralizing step to the second neutralizing step at a reaction temperature of 60° C. or less, the value of $\alpha_s/\varepsilon_s$ described later can be controlled to 0.5 or less. The reaction temperature is more preferably in a range of 5° C. or more and 25° C. or less, and by performing the reaction in the temperature range, the magnetic particle powder containing substantially no heterogeneous phase having a value of $\alpha_s/\varepsilon_s$ described later of 0.1 or less can be obtained. The reaction temperature of less than 5° C. is not preferred since the period of time required for the deflocculation of the hydroxide precipitate may be prolonged. The reason why the $\alpha$-type oxide tends to be formed by increasing the reaction temperature is not clear at the present time, and it is expected that a part of the ferrihydrite structure is changed.

In the case where the reaction temperature is controlled to 5° C. or more and 25° C. or less, when the neutralization reaction is performed in the first and second neutralizing steps, neutralization heat is generated, and the temperature of the reaction solution is increased. When the temperature of the reaction solution exceeds 25° C., an $\alpha$-type oxide can be prevented from being formed by cooling the reaction solution to 25° C. or less within 5 minutes.

The values of pH described in the description herein are measured according to JIS Z8802 with a glass electrode. The pH standard solution refers to the value that is measured with a pH meter calibrated with the suitable buffer solution corresponding to the pH range to be measured. The values of pH described in the description herein each are a value shown by the pH meter compensated with a temperature compensation electrode that is directly read under the reaction temperature condition.

Step of Adding Hydroxycarboxylic Acid

In the production method of the invention, a hydroxycarboxylic acid is subsequently added to the reaction solution that has been clear by retaining after neutralizing the raw material solution. A hydroxycarboxylic acid is a carboxylic acid that has an OH group in the molecule thereof, and functions as a complexing agent for iron ion. It is considered that the hydroxycarboxylic acid herein has such an effect that the hydroxycarboxylic acid forms a complex with the trivalent iron ion dissolved in the reaction solution, so as to retard the formation reaction of a hydroxide of iron in the second neutralization treatment in the next step, and consequently the distribution of the average particle diameter of the fine particles of the precursor of the iron oxyhydroxide thus formed is narrowed. It is considered that the hydroxycarboxylic acid partially forms a complex with the metal ion of the substituting element.

A hydroxycarboxylic acid includes various kinds, such as glycolic acid, lactic acid, various hydroxybutyric acids, glyceric acid, malic acid, tartaric acid, citric acid, and mevalonic acid, and a polybasic aliphatic hydroxycarboxylic acid is preferred from the standpoint of the complexing capability, and tartaric acid, citric acid, and malic acid are more preferred from the standpoint of the cost and the availability.

As for the amount of the hydroxycarboxylic acid added, when the molar ratio with respect to the amount of the trivalent iron ion (D/Fe) in the case of the substituting metal ion is not contained, or the molar ratio with respect to the total amount of the trivalent iron ion and the ion of the metal M (D/(Fe+M)) in the case where the substituting metal ion is contained is less than 0.125, the slurry containing the precursor formed in the second neutralizing step as the next step becomes an aggregation system, and a uniform silicon oxide coating cannot be obtained in the subsequent step of coating a silicon oxide. The value of D/Fe or D/(Fe+M) that exceeds 1.0 is not preferred since the metal ions form a soluble complex to make a difference between the charged ratio of the metal ions to the raw material solution and the substituting amount of the metal ions in the resulting oxide, and the effect of retarding the formation reaction of a hydroxide may become excessive. It is expected that the hydroxycarboxylic acid also has such a function that the hydroxycarboxylic acid is adsorbed on the surface of the hydroxide colloid of iron in the reaction solution, so as to stabilize the dispersion of the hydroxide colloid.

The hydroxycarboxylic acid may be added under the mechanical stirring state retained, without change in reaction temperature from the first neutralizing step as the preceding step. The hydroxycarboxylic acid may be added in the form of solid to the reaction solution, and is preferably added thereto in the form of an aqueous solution from the standpoint of ensuring the uniformity of the reaction.

Second Neutralizing Step

In the production method of the invention, an alkali is further added to the reaction solution after the addition of the hydroxycarboxylic acid, so as to neutralize the solution until the pH thereof becomes 7.0 or more and 10.0 or less. The alkali to be added may be the same as in the first neutralizing step. Through this step, the nuclei of the iron oxyhydroxide as the precursor of the ε-type iron-based oxide, formed in the first neutralizing step are grown to form final precursor crystals.

In this step, by the addition of the alkali, the trivalent iron ion present in the reaction solution is reacted with $OH^-$ ion to form the iron oxyhydroxide, and at this time, it is considered that the hydroxide colloid of iron excellent in dispersibility functions as nuclei of precipitation, which, in the case where the substituting element is contained, prevents heterogeneous growth of the iron oxyhydroxide containing the substituting element depending on the reaction sites, and consequently the precursor having a narrow distribution of the average particle diameter can be obtained. It is expected that the trivalent iron ion present in the reaction solution gradually undergoes the reaction with $OH^-$ ion since the trivalent iron ion forms the complex with hydroxycarboxylic acid, and thus heterogeneous growth in size can be prevented among the iron oxyhydroxide particles containing the substituting element to be grown.

The reason why ferrihydrite is easily formed as the iron oxyhydroxide, or the iron oxyhydroxide containing the substituting element, as the precursor in the production method of the invention is not clear at the present time, and it is considered that the contribution is made by both factors that the iron hydroxide colloid functions as the formation nuclei, and the formation is performed through the reaction of substituting hydroxycarboxylic acid coordinated to the trivalent iron ion by $OH^-$ ion.

In this step, the pH after the neutralization that is less than 7.0 is not preferred since in the case where the substituting element is contained, the substituting element, such as Co, that has not completely been neutralized in the first neutralizing step may remain as ion in the solution, so as to cause deviation of the composition, and waste of Co occurs, which is economically disadvantageous. The pH that exceeds 10.0 after the neutralization is also not preferred since the effect of the neutralization may be saturated.

In the production method of the invention, the reaction temperature in the neutralization treatment is not particularly limited, and is preferably 60° C. or less. The reaction temperature that exceeds 60° C. is not preferred since ferrihydrite 6L is formed to facilitate the formation of a heterogeneous phase (a phase). By performing the first neutralizing step to the second neutralizing step at a reaction temperature of 60° C. or less, the value of $\alpha_s/\varepsilon_s$ described later can be controlled to 0.5 or less. The reaction temperature is more preferably in a range of 5° C. or more and 25° C. or less, and by performing the reaction in the temperature range, the magnetic particle powder containing substantially no heterogeneous phase having a value of $\alpha_s/\varepsilon_s$ described later of 0.1 or less can be obtained.

The reaction condition is preferably controlled to make a reaction time of 60 minutes or more and 480 minutes or less, taking the balance between the growth rate of the iron oxyhydroxide and the economic efficiency.

Step of Coating Silicon Oxide

In the production method of the invention, the iron oxyhydroxide, or the iron oxyhydroxide containing the substituting element as the precursor formed in the preceding steps is difficult to undergo phase transition to the ε-type iron-based oxide even though the iron oxyhydroxide is subjected to a heat treatment, and therefore the iron oxyhydroxide, or the iron oxyhydroxide containing the substituting element is subjected to a silicon oxide coating before the heat treatment. The coating method of a silicon oxide is preferably a sol-gel method. The silicon oxide referred herein includes not only ones having the stoichiometric composition, but also ones having nonstoichiometric compositions, such as a silanol derivative described later. The slurry containing the iron oxyhydroxide, or the iron oxyhydroxide containing the substituting element obtained in the second neutralizing step contains the ion of the inorganic acid salt contained in the raw material solution and the alkalis added in the first and second neutralizing steps, but this step can be performed without rinsing the slurry.

In the sol-gel method, a silicon compound having a hydrolyzable group, for example, a silane compound, such as tetraethoxysilane (TEOS), tetramethoxysilane (TMOS), and various silane coupling agents, is added to the aqueous solution of the iron oxyhydroxide crystals containing the substituting element having been dispersed after the reaction of the precursor, and stirred to cause hydrolysis reaction, and a silanol derivative thus formed is coated on the surface of the iron oxyhydroxide crystals. An acid catalyst or an alkali catalyst may be added, and is preferably added in consideration of the treatment time. Representative examples thereof include hydrochloric acid for the acid catalyst, and ammonia for the alkali catalyst. In the case where the acid catalyst is used, the amount thereof may be such an amount at most that does not dissolve the iron oxyhydroxide particles containing the substituting element. In addition, sodium silicate (liquid glass) as an inorganic silicon compound may also be used.

The specific procedure of the coating of the silicon oxide may be the same as the sol-gel method in the known process. For example, the reaction temperature for the silicon oxide coating by the sol-gel method may be 20° C. or more and 60° C. or less, and the reaction time therefor may be 1 hour or more and 20 hours or less. After coating the silicon oxide, the material may be subjected to solid-liquid separation and drying, so as to provide a specimen before the heat treatment. The material may be rinsed after the coating treatment before the solid-liquid separation. In the solid-liquid separation herein, solid-liquid separation may be performed with an aggregating agent added.

Heat Treatment

In the production method of the invention, the iron oxyhydroxide, or the iron oxyhydroxide containing the substituting element as the precursor coated with the silicon oxide is heat-treated to provide the ε-type iron-based oxide. Before the heat treatment, steps of rinsing and drying may be performed. The heat treatment may be performed in an oxidizing atmosphere, and the oxidizing atmosphere may be the air atmosphere. While the heat treatment temperature may vary depending on the amount of the silicon oxide coated and cannot be determined unconditionally, the heating may be performed in a range approximately of 700° C. or more and 1,300° C. or less. In the case where the heating temperature is too low, a heterogeneous phase or a compound insufficient in phase transformation tends to be mixed therein. Furthermore, the particle diameter of the resulting product may be small in some cases, which results in fluctuation in magnetic characteristics, and consequently it may be difficult to apply the material to the high density magnetic recording purpose, which requires entirely uniform magnetic characteristics. This deviates from the spirit of the invention. When the lower limit of the heating temperature is set at 700° C. or more, the ε-type iron-based oxide as the target of the invention can be selectively formed stably, and the heterogeneous phase or the compound insufficient in phase transformation can be suppressed from being formed, thereby providing magnetic powder having uniform magnetic characteristics suitable for high density magnetic recording. When the heating temperature is too high, $\alpha$-$Fe_2O_3$ as a thermodynamically stable phase (which is an impurity to $\varepsilon$-$Fe_2O_3$) tends to be formed, and the heat treatment is preferably performed at 900° C. or more and 1,200° C. or less, and more preferably 950° C. or more and 1,150° C. or less. The heat treatment time may be controlled to a range approximately of 0.5 hour or more and 10 hours or less, and a favorable result can be easily obtained in a range of 2 hours or more and 5 hours or less. It is considered that the presence of the silicon-containing substance covering the particles advantageously affects the phase transition to the ε-type iron-based oxide, but not to the phase transition to the α-type iron-based oxide. The silicon oxide coating also has a function of preventing the crystals of the iron oxyhydroxide, or the iron oxyhydroxide containing the substituting element from being sintered in the heat treatment.

Through the process steps described above, $\varepsilon$-$Fe_2O_3$ crystals are obtained in the case where the raw material solution contains only trivalent iron ion as the metal ion, and partially substituted $\varepsilon$-$Fe_2O_3$ crystals are obtained in the case where the raw material solution contains trivalent iron ion and the metal element for substituting Fe sites as metal ions, in the form coated with the silicon oxide. The powder obtained after the heat treatment may contain, in addition to the ε-type iron-based oxide, an α-type iron-based oxide, a γ-type iron-based oxide, and $Fe_3O_4$ crystals, as impurities in some cases, and these materials are referred totally as the iron-based oxide magnetic particle powder.

The iron-based oxide magnetic particle powder obtained by the production method of the invention can be used in the state where the silicon oxide is coated, and can also be used in the state where the silicon oxide coated on the surface is removed by the step described below depending on purposes.

Step of Removing Silicon Oxide Coating

In the case where the coating of the silicon oxide is not necessary for the iron-based oxide magnetic particle powder, or in the case where the iron-based oxide magnetic particle powder is to be classified for enhancing the magnetic recording characteristics, the silicon oxide coated on the $\varepsilon$-$Fe_2O_3$ crystals or the partially substituted $\varepsilon$-$Fe_2O_3$ crystals may be removed in advance. For the purpose of a coating type magnetic recording medium, magnetic particles coated on a tape are necessarily subjected to a magnetic field orientation treatment, and the state where the silicon oxide is coated has decreased magnetization per unit area of a tape (a signal from the tape is decreased) due to the presence of the silicon oxide as a non-magnetic component. Accordingly, the silicon oxide coated is preferably removed by the step described below. As a specific method, since the silicon oxide is soluble in an alkaline aqueous solution, the silicon oxide may be dissolved and removed by immersing and stirring the powder after the heat treatment in an aqueous solution containing a strong alkali, such as NaOH and KOH. In the case where the dissolution rate is to be increased, the alkaline aqueous solution may be heated. As a representative example, the silicon oxide may be favorably dissolved by stirring the powder in a state, in which an alkali, such as NaOH, is added in an amount 3 times by mol or more the silicon oxide, and the temperature of the aqueous solution is 60° C. or more and 70° C. or less. The extent of the removal of the silicon oxide coating may be controlled depending on purposes.

After the removal, unnecessary ion is necessarily rinsed out with water until the electroconductivity of the filtrate reaches 50 mS/m or less for ensuring the good dispersibility in the subsequent step.

Observation with Transmission Electron Microscope (TEM)

The observation of the iron-based oxide magnetic particle powder obtained by the production method of the invention with a TEM is performed under the following condition.

The TEM used for observation is JEM-1011, produced by JEOL, Ltd. For the observation of particles, micrographs are taken at a magnification of 10,000 and 100,000, and enlarged by 3 times on developing, and the resulting TEM micrographs are used.

The average particle diameter and the evaluation of the particle size distribution (i.e., the coefficient of variation (%)) are measured by digitizing, in which the distance between two points in one particle that are most remote from each other is measured. The number of particles measured is 300 or more (using the particles after removing the silicon oxide coating).

Measurement of X-ray Diffraction (XRD) Pattern

The resulting specimen is subjected to powder X-ray diffraction (XRD, RINT 2000, produced by Rigaku Corporation, radiation source: CoKα, voltage: 40 kV, current: 30 mA, 2θ=10° or more and 80° or less) By the measurement, the precursor phase, the formation of the ε-phase, and the heterogeneous phase are confirmed.

The values $\alpha_s$ and $\varepsilon_s$ are obtained in the following manner, and the ratio of the resulting peak heights $\alpha_s/\varepsilon_s$ is obtained from the resulting values.

The value $\alpha_s$ is the maximum value of the diffraction intensity except for the background in the X-ray diffractiometry performed at 2θ of 27.2° or more and 29.7° or less (i.e., the position of the diffraction peak of the α-phase that does not overlap the diffraction peak of the ε-phase), and the value $\varepsilon_s$ is the maximum value of the diffraction intensity except for the background in the X-ray diffractiometry performed at 2θ of 42° or more and 44° or less (i.e., the position of the diffraction peak of the ε-phase that does not overlap the diffraction peak of the α-phase). For the calculation method of the background, the average value of the diffraction intensity at 27.1° or more and 27.2° or less and 29.7° or more and 29.8° or less is used for 27.2° or more and 29.7° or less, and the average value of the diffraction intensity at 39.9° or more and 40.0° or less and 44.0° or more and 44.1° or less is used for 42° or more and 44° or less. The ratio of the resulting peak heights $\alpha_s/\varepsilon_s$ is obtained from these values.

$\alpha_s$=(maximum value of X-ray diffraction intensity at 27.2° or more and 29.7° or less)−(average value of diffraction intensity at 27.1° or more and 27.2° or less and 29.7° or more and 29.8° or less)

$\varepsilon_s$=(maximum value of X-ray diffraction intensity at 42° or more and 44° or less)−(average value of diffraction intensity at 39.9° or more and 40.0° or less and 44.0° or more and 44.1° or less)

In consideration of the use of the iron-based oxide magnetic particle powder in a magnetic recording medium, the nonmagnetic α-type oxide is an impurity that does not contribute to magnetic recording, and therefore when the value of the ratio of the resulting peak heights $\alpha_s/\varepsilon_s$ is smaller, the amount of the particles that do not contribute to magnetic recording is decreased to increase the recording density. According to the production method of the invention, the iron-based oxide magnetic particle powder that has a value of $\alpha_s/\varepsilon_s$ of 0.5 or less can be obtained.

Compositional Analysis by High-frequency Inductively Coupled Plasma (ICP) Atomic Emission Spectroscopy The compositional analysis is performed with ICP-720ES, produced by Agilent Technologies, Inc. The measurement wavelengths (nm) are Fe: 259.940 nm, Ga: 294.363 nm, Co: 230.786 nm, Ti: 336.122 nm, and Si: 288.158 nm.

Measurement of Magnetic Hysteresis Curve (B-H Curve)

The magnetic characteristics are measured with a vibrating sample magnetometer VSM (VSM-5, produced by Toei Industry Co., Ltd.) at an applied magnetic field of 1,035 kA/m (13 kOe), an M measurement range of 0.005 A·m² (5 emu), a step bit of 80 bit, a time constant of 0.03 sec, and a wait time of 0.1 sec. The coercive force Hc, the saturation magnetization σs, and SFD are evaluated by the B-H curve, and the low Hc component that does not contribute to magnetic recording is evaluated by the differential B-H curve. In the measurements and evaluation herein, the attached software, produced by Toei Industry Co., Ltd., (ver. 2.1) is used.

In the description herein, the differential B-H curve is calculated in addition to the ordinary magnetic characteristics, and thereby the magnetic characteristics of the resulting iron-based oxide magnetic particle powder are analyzed in more detail. The specific analysis method will be described below (see FIG. 4 shown later).

In the measurement of the B-H curve of the iron-based oxide magnetic particle powder containing the $\varepsilon\text{-Fe}_2\text{O}_3$ or the partially substituted $\varepsilon\text{-Fe}_2\text{O}_3$ produced by the liquid phase method, when the external magnetic field is increased after completing the demagnetization, a small shoulder (depression) is present in the increase curve of the magnetic flux density around the zero magnetic field. Accordingly, two peaks are observed in the differential B-H curve obtained by numerical differentiation of the B-H curve. This means that the B-H curve measured for the iron-based oxide magnetic particle powder is a result of synthesis of two B-H curves with different coercive forces Hc, and the iron-based oxide magnetic particle powder contains two components with different magnetic characteristics.

The component on the low Hc side is a component that does not contribute to the enhancement of the recording density in the use of the iron-based oxide magnetic particle powder in a magnetic recording medium. In the case where the proportion of the extremely finer particles than the average particle diameter contained in the iron-based oxide magnetic particle powder is decreased by such a measure as the change of the production condition, and the classification, decrease of the height of the peak on the low Hc side in the differential B-H curve is observed, from which it is understood that the fine particles are the low Hc component.

In consideration of the use of the iron-based oxide magnetic particle powder in a magnetic recording medium, when the ratio of the peak heights $I_L/I_H$ is smaller, the amount of the particles that do not contribute to magnetic recording is decreased, and thus the recording density is increased, in which $I_L$ represents the intensity of the intercept of the ordinate at zero magnetic field in the differential B-H curve, and $I_H$ represents the peak height on the high Hc side therein. According to the production method of the invention, the iron-based oxide magnetic particle powder that has a value of $I_L/I_H$ of 0.7 or less, preferably 0.53 or less, can be obtained.

The value obtained by dividing the half bandwidth of the peak on the high Hc side by Hc is a value corresponding to SFD (switching field distribution), and when the half bandwidth is smaller, the coercive force distribution of the iron-based oxide magnetic particle powder is narrower. According to the production method of the invention, the iron-based oxide magnetic particle powder that has a smaller half bandwidth of the peak on the high Hc side than the ordinary production method, and has SFD of 1.3 or less can be obtained.

Preparation of Magnetic Coating Material 0.31 g of a sample powder is weighed and placed in a stainless steel pot (inner diameter: 45 mm, depth: 13 mm), which is allowed to be in a state where the lid thereof is opened for 10 minutes. A vehicle (obtained by dissolving 34.9 g of a urethane resin (UR-8200, produced by Toyobo Co., Ltd.) and 15.8 g of a vinyl chloride resin (MR-555, produced by Nippon Zeon Corporation) in a mixed solvent of 0.25 g of acetylacetone, 0.25 g of n-butyl stearate, and 97.9 mL of cyclohexane) is collected in an amount of 1.11 mL with a micropipette and added to the stainless steel pot. Immediately thereafter, 30 g of steel balls (diameter: 2 mm) and 10 pieces of nylon balls (diameter: 8 mm) are added to the pot, and after closing the lid, the pot is allowed to stand for 10 minutes. Thereafter, the pot is mounted on a centrifugal ball mill (Fritsch P-6), the rotation number of the disk is increased to 600 rpm over 5 seconds, and then the dispersion treatment is performed at a rotation number of the disk of 600 rpm for 60 minutes. After the centrifugal ball mill is stopped, the pot is taken out therefrom, to which 0.70 mL of a conditioning liquid, which is a mixture of MEK and toluene having been mixed in advance at a ratio of 1/1, is added thereto with a micropipette. The pot is again mounted on the centrifugal ball mill, and subjected to a dispersion treatment at a rotation number of the disk of 600 rpm for 5 minutes, so as to prepare a coating material.

Formation of Magnetic Sheet

After completing the dispersion shown above, the lid of the pot is opened, the nylon balls are removed, and the coating material.

thus prepared is placed in an applicator (distance: 250 μm) along with the steel balls, and coated on a supporting film (a polyethylene film, Lumirror, a trade name, produced by Toray Industries, Inc.). Within 5 seconds after coating, the coated film is subjected to magnetic field orientation by placing at the center of the coil of the orientation device with a magnetic flux density of 0.55 T, and then dried by allowing to stand.

Measurement of Magnetic Hysteresis Curve (Sheet B-H Curve)

A plastic plate is adhered to the film for enabling the discrimination of the magnetic field orientation direction thereof, and the assembly is cut with a punch or the like to form a measurement piece having a 10 mm square, which is mounted with the orientation direction aligned with the direction of the applied magnetic field, and measured for the saturation magnetic flux density Bs (Gauss) and the residual magnetic flux density Br (Gauss) at an external magnetic field of 795.8 kA/m (10 kOe), and the value of SQx (=Br/Bs) in the orientation direction of the magnetic field is obtained, with a VSM machine (VSM-P7), produced by Toei Industry Co., Ltd. Furthermore, the value of SQy (=Br/Bs) in the direction perpendicular to the orientation direction of the magnetic field is obtained, and the value of OR (SQx/SQy) is obtained.

In the field of a coating type magnetic recording medium, the squareness ratio (SQx) in the orientation direction of the magnetic field (which is referred to as the x direction) is demanded to be large as the tape characteristics from the standpoint of the medium suitable for the recording system. The squareness ratio (SQx=Br/Bs) is the ratio of the residual magnetic flux density Br of the tape to the saturation magnetic flux density Bs of the tape in the application of a magnetic field in the orientation direction of the magnetic field, and is a value that is used as an index of the orientation. A large value of SQx provide the enhancement of the output, and therefore for achieving a high performance coating type magnetic recording medium, such magnetic powder is demanded that is excellent in dispersibility and orientation for enhancing SQx. The orientation ratio (OR=SQx/SQy) is a value obtained by dividing the squareness ratio SQx in the orientation direction by the squareness ratio SQy in the direction perpendicular thereto, and is also a value that is used as an index of the orientation, and powder capable of increasing the value is demanded.

When the iron-based oxide magnetic particle powder of the invention is formed into a coating material and a medium, SQx and OR are largely improved, and a magnetic sheet (magnetic recording medium) showing excellent characteristics can be obtained.

EXAMPLES

Example 1

To 3,214.78 g of pure water in a 5 L reaction vessel, 291.32 g of ferric(III) nitrate nonahydrate having a purity of 99.4%, 80.18 g of a Ga(III) nitrate solution having a Ga concentration of 10.1%, 6.58 g of cobalt(II) nitrate hexahydrate having a purity of 97%, and 7.14 g of titanium(IV) sulfate having a Ti concentration of 14.7% were dissolved by mechanically stirring with a stirring blade in the air atmosphere under condition of 40° C. The charged solution had a molar ratio of metal ions of Fe/Ga/Co/Ti=1.635/0.265/0.050/0.050. The numeral in parentheses following the compound name shows the valence of the metal element.

In the air atmosphere at 40° C., 166.29 g of an ammonia solution of 21.2% was added at once under mechanically stirring with a stirring blade to make pH after neutralization of 1.0 or more and 3.0 or less, followed by continuously stirring for 2 hours. The turbid brown solution in the initial stage of addition was changed to a transparent brown reaction solution after 2 hours, and the pH thereof was 1.96.

Subsequently, 252.66 g of a citric acid solution having a citric acid concentration of 10% by mass was continuously added under a condition of 40° C. over 1 hour, then 200 g of an ammonia solution of 10% by mass was added at once to make pH of 7.0 or more and 10.0 or less, so as to make pH of 8.47, and then the solution was retained under a condition of a temperature of 40° C. for 1 hour under stirring, so as to form crystals of iron oxyhydroxide containing substituting elements as a precursor as an intermediate (procedure 1). In this example, the molar ratio with respect to the total amount of the trivalent iron ion and the ion of the metal M substituting a part of Fe sites D/(Fe+M) was 0.15.

FIG. 1 shows the X-ray diffraction pattern of the iron oxyhydroxide crystals containing substituting elements obtained in this example. The X-ray diffraction pattern shows that the iron oxyhydroxide has a ferrihydrite structure.

As a result of observation with TEM of the iron oxyhydroxide crystals containing substituting elements obtained in this example, the primary particle size of the iron oxyhydroxide crystals containing substituting elements was as small as in a single nanosize, and the particles were spread two-dimensionally without aggregates, thus providing good dispersibility.

Thereafter, in the air atmosphere at 30° C., 488.13 g of tetraethoxysilane was added to the precursor slurry obtained in the procedure 1 over 35 minutes under stirring. The slurry was continuously stirred for approximately one day at 30° C. retained, and thereby the silanol derivative formed through hydrolysis was coated. Thereafter, a solution obtained by dissolving 194.7 g of ammonium sulfate in 300 g of pure water was added, and the resulting solution was rinsed and subjected to solid-liquid separation to form a cake, which was recovered (procedure 2).

The precipitate obtained in the procedure 2 (the precursor coated with $SiO_2$ in the form of gel) was dried, and the dried powder was then subjected to a heat treatment in a furnace with an air atmosphere at 1,070° C. for 4 hours, so as to provide iron-based oxide magnetic particle powder coated with a silicon oxide. The silanol derivative is changed to an oxide in the heat treatment in an air atmosphere (procedure 3).

The heat-treated powder obtained in the procedure 3 was stirred in an NaOH aqueous solution of 20% by mass at approximately 70° C. for 24 hours, so as to remove the silicon oxide on the surface of the particles. Subsequently, the powder was rinsed until the conductivity of the rinsed slurry reached 15 mS/m or less, and after drying, subjected to the chemical analysis of the composition, the XRD measurement, the TEM observation, the measurement of the magnetic characteristics, and the like. The measurement results are shown in Table 1.

The chemical composition of the resulting iron-based oxide magnetic particle powder was the substantially same as the charged composition while Fe was slightly large and Ga was slightly small.

FIG. 2 shows the TEM micrograph of the iron-based oxide magnetic particle powder obtained in this example, and the measurement results of the charge ratios of the metal ions and the measurement results including the average particle diameter, and the like are shown in Table 1. The length of the white bar shown on the left side of the TEM micrograph shows 50 nm (which is the same as in the other TEM micrographs below).

FIG. 3 shows the X-ray diffraction pattern of the resulting iron-based oxide magnetic particle powder obtained in this example. The enlarged view thereof around the diffraction angle of 28° and the enlarged view thereof around the diffraction angle of 42° are also shown, which show the substantially same crystal structure as $\varepsilon$-$Fe_2O_3$. FIG. 3 also shows the results obtained in Example 4 and Comparative Examples 1 and 2.

FIG. 4 shows (a) the B-H curves and (b) the differential B-H curves of the iron-based oxide magnetic particle powder obtained in this example, and the measurement results including the coercive force and the like are shown in Table 1. FIG. 4(b) is normalized to make the peaks on the high Hc side to have the same height except for the reference example, and the ordinate (dB/dH) is an arbitrary intensity.

The iron-based oxide magnetic particle powder obtained in this example had an average particle diameter of 16.6 nm and a coefficient of variation (CV value) of 40.2%. The differential B-H curve had two clear peaks observed, the value of SFD obtained from the half bandwidth of the peak of the high Hc component was 0.89, the proportion of the low Hc component $I_L/I_H$ was 0.50, and the value of $\alpha_s/\varepsilon_s$ was 0.12. The value of SFD and the value of $I_L/I_H$ were better than those of the iron-based oxide magnetic particle powder obtained in Comparative Example 1 described later, and it was understood that the value of SFD and the value of $I_L/I_H$ were increased by performing the neutralization treatment in two stages. The value of $\alpha_s/\varepsilon_s$ of this example was better than that of Comparative Example 2, and it is considered that this is because the increase of the amount of the hydroxycarboxylic acid (which is citric acid in this case) added improves the dispersibility of the slurry containing the precursor.

Examples 2 and 3

Iron-based oxide magnetic particle powder was obtained in the same manner as in Example 1 except that D/(Fe+M) was 0.2 (Example 2) or 0.3 (Example 3), and the baking temperature of the oxide was 1,055° C. in Example 3.

FIG. 4 shows (a) the B-H curves and (b) the differential B-H curves of the iron-based oxide magnetic particle powder obtained in this example, and the measurement results including the average particle diameter and the like of the iron-based oxide magnetic particle powder obtained in these examples are shown in Table 1. FIG. 7 shows the X-ray diffraction pattern of the iron-based oxide magnetic particle powder obtained in Example 2 and the enlarged views thereof around the diffraction angle of 28° and the diffraction angle of 42°, which show the substantially same crystal structure as $\varepsilon$-$Fe_2O_3$.

The iron-based oxide magnetic particle powder obtained in Example 2 had an average particle diameter of 17.0 nm and a coefficient of variation (CV value) of 41.1%, the value of SFD obtained from the half bandwidth of the peak of the high Hc component was 0.81, the proportion of the low Hc component $I_L/I_H$ was 0.43, and the value of $\alpha_s/\varepsilon_s$ was 0.14. The iron-based oxide magnetic particle powder obtained in Example 3 had an average particle diameter of 15.5 nm and a coefficient of variation (CV value) of 34.1%, the value of SFD obtained from the half bandwidth of the peak of the high Hc component was 0.90, the proportion of the low Hc component $I_L/I_H$ was 0.48, and the value of $\alpha_s/\varepsilon_s$ was 0.14. In these examples, the same effects as in Example 1 above were obtained.

The baking temperature of the oxide was changed for making uniform the particle size and the BET surface area of the iron-based oxide magnetic particle powder finally obtained, and it was confirmed that the change substantially did not affect the other physical characteristics.

Examples 4 to 6

Iron-based oxide magnetic particle powder was obtained in the same manner as in Example 1 except that the reaction temperature from the first neutralizing step to the second neutralizing step was 20° C., and D/(Fe+M) was 0.15 (Example 4, the same condition as in Example 1), 0.2 (Example 5, the same condition as in Example 2), or 0.3 (Example 6, the same condition as in Example 3), and the baking temperature of the oxide was 1,055° C. in Example 6. The measurement results including the average particle diameter and the like of the iron-based oxide magnetic particle powder obtained in these examples are shown in Table 1. In the case where the reaction temperature was lowered to 20° C., there was no significant improvement effect observed for SFD and $I_L/I_H$, but the value of $\alpha_s/\varepsilon_s$ became a value of 0.10 or less, i.e., 0.04 (Example 4), 0.05 (Example 5), or 0.05 (Example 6).

Comparative Example 1

To 20,308.86 g of pure water in a reaction vessel, 3,296.53 g of ferric(III) nitrate nonahydrate having a purity of 99.2% by mass, 854.72 g of a Ga (III) nitrate solution having a Ga concentration of 10.70% by mass, 74.27 g of cobalt(II) nitrate hexahydrate having a purity of 97% by mass, and 77.96 g of titanium(IV) sulfate having a Ti concentration of 15.2% were dissolved by mechanically stirring with a stirring blade in the air atmosphere under condition of 30° C. The charged solution had a molar ratio of metal ions of Fe/Ga/Co/Ti=1.635/0.265/0.050/0.050.

To the raw material solution under condition of a temperature of 30° C., 2,766.67 g of an ammonia solution having a concentration of 22.35% by mass was added, and at the time when the pH became 8.0 or more and 9.0 or less, the solution was stirred for 30 minutes. In this case, the neutralization was performed in one stage, and citric acid was not added. In this case, crystals having the same crystal form as ferrihydrite were precipitated as the iron oxyhydroxide as the intermediate. Subsequently, without rinsing the iron oxyhydroxide crystals with water, 5,646.15 g of tetraethoxysilane was added directly to the reaction solution over 35 minutes. After the addition, the slurry was continuously stirred for approximately one day at 30° C. retained, and thereby the silanol derivative formed through hydrolysis of tetraethoxysilane was coated on the surface of the iron oxyhydroxide crystals. The subsequent procedures were the same as in Example 1 except that the baking temperature was 1,058° C. These procedures are according to those described in PTL 1.

The measurement results including the average particle diameter and the like of the iron-based oxide magnetic particle powder obtained in this comparative example are shown in Table 1.

FIG. 4 shows the B-H curves and the differential B-H curves of the iron-based oxide magnetic particle powder obtained in this comparative example, and the measurement results including the cohesive force and the like thereof are shown in Table 1.

The iron-based oxide magnetic particle powder obtained in this comparative example had an average particle diameter of 15.7 nm and a coefficient of variation (CV value) of 49.6%. It was understood that in this comparative example, in which the neutralization treatment was performed in one stage, and citric acid was not added, the particle size distribution was inferior as compared to the examples of the invention.

In the iron-based oxide magnetic particle powder obtained in Comparative Example 1, the value of SFD was 1.69, and the proportion of the low Hc component $I_L/I_H$ was 0.76, which showed that the cohesive force distribution was broader, and the magnetic recording capability was lower, than the iron-based oxide magnetic particle powder obtained in the examples of the invention.

Comparative Example 2

Iron-based oxide magnetic particle powder was obtained in the same manner as in Example 1 except that D/(Fe+M) was 0.1, and the baking temperature was 1,055*C.

In the iron-based oxide magnetic particle powder obtained in Comparative Example 2, the value of SFS was 0.87, and the value of $I_L/I_H$ was 0.42, but the value of $\alpha_s/\varepsilon_s$ was 0.52 indicating a large amount of the heterogeneous phase contained.

TABLE 1

| | | 1 | 2 | 3 | 4 | 5 | 6 | 1 | 2 | 7 | 8 |
|---|---|---|---|---|---|---|---|---|---|---|---|
| Composition | Fe | 1.66 | 1.66 | 1.66 | 1.64 | 1.66 | 1.67 | 1.64 | 1.67 | 1.57 | 1.55 |
| | Co | 0.04 | 0.04 | 0.02 | 0.05 | 0.04 | 0.03 | 0.05 | 0.05 | 0.04 | 0.05 |
| | Ti | 0.05 | 0.06 | 0.06 | 0.06 | 0.06 | 0.05 | 0.06 | 0.05 | 0.05 | 0.07 |
| | Ga | 0.24 | 0.25 | 0.26 | 0.26 | 0.25 | 0.25 | 0.24 | 0.23 | 0.34 | 0.33 |
| TEM average particle diameter (nm) | | 16.6 | 17.0 | 15.5 | 17.2 | 16.8 | 16.3 | 15.7 | 20.7 | 16.7 | 17.8 |
| Coefficient of variation of average particle diameter (%) | | 40.2 | 41.1 | 34.1 | 41.8 | 41.0 | 36.5 | 49.6 | 48.0 | 41.4 | 39.4 |
| Coercive force Hc (kA/m) | | 313.5 | 350.6 | 397.1 | 316.9 | 376.0 | 390.0 | 279.9 | 254.7 | 221.9 | 198.0 |
| Coercive force Hc (Oe) | | 3939 | 4406 | 4990 | 3982 | 4725 | 4901 | 3517 | 3201 | 2789 | 2488 |
| Saturation magnetization σs (Am²/kg) | | 15.8 | 15.5 | 14.8 | 17.2 | 16.9 | 16.9 | 16.5 | 13.1 | 17.2 | 17.5 |
| SFD | | 0.89 | 0.81 | 0.90 | 0.82 | 0.69 | 0.83 | 1.69 | 0.87 | 1.06 | 0.89 |
| $I_L/I_H$ | | 0.50 | 0.43 | 0.48 | 0.45 | 0.37 | 0.46 | 0.76 | 0.42 | 0.55 | 0.53 |
| $\alpha_s/\varepsilon_s$ | | 0.12 | 0.14 | 0.14 | 0.04 | 0.05 | 0.04 | 0.10 | 0.52 | 0.05 | 0.04 |

Example 7

To 2,453.58 g of pure water in a 5 L reaction vessel, 465.93 g of ferric (III) nitrate nonahydrate having a purity of 99.7%, 152.80 g of a Ga. (III) nitrate solution having a Ga concentration of 12.0%, 15.78 g of cobalt (II) nitrate hexahydrate having a purity of 97%, and 11.91 g of titanium (IV) sulfate having a Ti concentration of 15.1% were dissolved by mechanically stirring with a stirring blade in the air atmosphere under condition of 40° C. The charged solution had a molar ratio of metal ions of Fe/Ga/Co/Ti=1.530/0.350/0.070/0.050.

In the air atmosphere at 40° C., 268.52 g of an ammonia solution of 22.43% was added at once under mechanically stirring with a stirring blade to make pH after neutralization of 1.0 or more and 3.0 or less, followed by continuously stirring for 2 hours. The turbid brown solution in the initial stage of addition was changed to a transparent brown reaction solution after 2 hours, and the pH thereof was 1.91.

Subsequently, 288.75 g of a citric acid solution having a citric acid concentration of 20% by mass was continuously added under a condition of 40° C. over 1 hour, then 152.86 g of an ammonia solution of 22.43% was added at once to make pH of 7.0 or more and 10.0 or less, so as to make pH of 8.55, and then the solution was retained under a condition of a temperature of 40° C. for 1 hour under stirring, so as to form crystals of iron oxyhydroxide containing substituting elements as a precursor as an intermediate (procedure 1). In this example, the molar ratio with respect to the total amount of the trivalent iron ion and the ion of the metal M substituting a part of Fe sites D/(Fe+M) was 0.20.

While the TEM micrograph of the iron oxyhydroxide crystals containing substituting elements obtained in this example is not shown herein, the primary particle size of the iron oxyhydroxide crystals containing substituting elements was as small as in a single nanosize, and the particles were spread two-dimensionally without aggregates, thus providing good dispersibility, as similar to Examples 1 to 6.

Thereafter, in the air atmosphere at 40° C., 833.44 g of tetraethoxysilane corresponding to approximately 700% by mass with respect to the amount of Fe and M contained in the partially substituted ε-$Fe_2O_3$ (approximately equal to the amount of Fe and M contained in the raw material solution) was added to the precursor slurry obtained in the procedure 1 over 35 minutes under stirring. In this example, the molar ratio Si/(Fe+M) of silicon with respect to the total amount of the trivalent iron ion and the ion M of the metal substituting a part of the Fe sites was 2.58. The slurry was continuously stirred for approximately one day, and thereby the silanol derivative formed through hydrolysis was coated. Thereafter, the resulting solution was rinsed and subjected to solid-liquid separation to form a cake, which was recovered (procedure 2).

The precipitate obtained in the procedure 2 (the precursor coated with $SiO_2$ in the form of gel) was dried, and the dried powder was then subjected to a heat treatment in a furnace with an air atmosphere at 1,065° C. for 4 hours, so as to provide iron-based oxide magnetic particle powder coated with a silicon oxide. The silanol derivative is changed to an oxide in the heat treatment in an air atmosphere (procedure 3).

The heat-treated powder obtained in the procedure 3 was stirred in an NaOH aqueous solution of 20% by mass at approximately 70° C. for 24 hours, so as to remove the silicon oxide on the surface of the particles. Subsequently, the powder was rinsed until the conductivity of the rinsed slurry reached 15 mS/m or less, and after drying, subjected to the chemical analysis of the composition, the XRD measurement, the TEM observation, the measurement of the magnetic characteristics, and the like.

The chemical composition of the resulting iron-based oxide magnetic particle powder was the substantially same as the charged composition while Fe was slightly large and Ga was slightly small.

FIG. 6 shows the TEM micrograph of the iron-based oxide magnetic particle powder obtained in this example, and the measurement results of the charge ratios of the metal ions and the measurement results including the average particle diameter, and the like are shown in Table 1.

FIG. 7 shows the X-ray diffraction pattern of the resulting iron-based oxide magnetic particle powder obtained in this example, and the enlarged views thereof around the diffraction angle of 28° and the diffraction angle of 42° are also shown, which show the substantially same crystal structure as ε-$Fe_2O_3$.

FIG. 8 shows (a) the B-H curves and (b) the differential B-H curves of the iron-based oxide magnetic particle powder obtained in this example, and the measurement results including the coercive force and the like are shown in Table 1. In FIG. 8, the results of the iron-based oxide magnetic particle powder obtained in Example 2 are also shown again for reference.

The iron-based oxide magnetic particle powder obtained in this example had an average particle diameter of 16.7 nm and a coefficient of variation (CV value) of 41.4%. The differential B-H curve had two clear peaks observed, the value of SFD obtained from the half bandwidth of the peak of the high Hc component was 1.06, the proportion of the low Hc component $I_L/I_H$ was 0.55, and the value of $\alpha_s/\varepsilon_s$ was 0.05. The value of SFD and the value of $I_L/I_H$ were better than those of the iron-based oxide magnetic particle powder obtained in Comparative Example 1 described later, and it was understood that the value of SFD and the value of $I_L/I_H$ were increased by performing the neutralization treatment in two stages. The value of $\alpha_s/\varepsilon_s$ of this example was better than that of Comparative Example 2, and it is considered that this is because the increase of the amount of the hydroxycarboxylic acid (which is citric acid in this case) added improves the dispersibility of the slurry containing the precursor.

Example 8

Iron-based oxide magnetic particle powder was obtained in the same manner as in Example 7 except that under the same condition as in Example 7, 416.89 g of tetraethoxysilane corresponding to approximately 350% by mass as a half of Examples 1 to 6 with respect to the partially substituted ε-$Fe_2O_3$ was added to the precursor slurry obtained in the procedure 1 over 35 minutes, and the baking temperature of the oxide was 1,008° C. In this example, the molar ratio Si/(Fe+M) of silicon with respect to the total amount of the trivalent iron ion and the ion M of the metal substituting a part of the Fe sites was 1.29.

For the iron-based oxide magnetic particle powder obtained in this example, the X-ray diffraction pattern thereof is shown in FIG. 7, (a) the B-H curves and (b) the differential B-H curves thereof are shown in FIG. 8, and the measurement results including the average particle diameter and the like of the resulting iron-based oxide magnetic particle powder obtained in this example are shown in Table 1.

The iron-based oxide magnetic particle powder obtained in Example 8 had an average particle diameter of 17.8 nm and a coefficient of variation (CV value) of 39.4%. The value of SFD obtained from the half bandwidth of the peak of the high Hc component was 0.89, the proportion of the low Hc component $I_L/I_H$ was 0.53, and the value of $\alpha_s/\varepsilon_s$ was 0.04. In this example, the same effects as in Examples 1 to 6 were obtained.

It was found from the comparison of the differential B-H curves of this example and Example 7 that when the molar ratio Si/(Fe+M) was decreased, the half bandwidth of the peak of the high Hc component was clearly narrowed, and the SFD (coercive force distribution) was improved.

Magnetic tapes were produced by using the iron-based oxide magnetic particle powder obtained in Example 2, Example 5, and Comparative Example 1 according to the aforementioned procedures, and the magnetic characteristics of the tapes were measured. The dispersion time in the production of the tapes was 60 minutes, and the coating material.
were dried in a magnetic field of 5.5 kOe (438 kA/m). The results of the measurement are shown in Table 2.

The iron-based oxide magnetic particle powder having been formed into a coating material and into a medium showed excellent characteristics for SQx and RO used as important indices of orientation in the characteristics of the magnetic tape, and it was found that the enhancement of the recording density of the magnetic recording medium was enabled.

TABLE 2 dispersion time: 60 minutes

|  | Tape characteristics (VSM 10kOe) | |
| --- | --- | --- |
|  | SQx | OR |
| Example 2 | 0.76 | 1.76 |
| Example 5 | 0.77 | 1.88 |
| Comparative Example 1 | 0.68 | 1.62 |

The invention claimed is:

1. A method for producing an iron-based oxide magnetic particle powder containing $\epsilon$-Fe$_2$O$_3$, or $\epsilon$-Fe$_2$O$_3$, a part of Fe sites of which is substituted by another metal element M, having an average particle diameter measured with a transmission electron microscope of 10 nm or more and 30 nm or less, the iron-based oxide magnetic particle powder having a value of $I_L/I_H$ according to the following definition of 0.7 or less, and a value of $\alpha_s/\epsilon_s$, according to the following definition of 0.5 or less, the method comprising:
a first neutralizing step of neutralizing an aqueous solution containing a trivalent iron ion, or containing a trivalent iron ion and an ion of the metal M substituting a part of Fe sites to pH of 1.0 or more and 3.0 or less;
a step of adding a hydroxycarboxylic acid D to the aqueous solution after the neutralization in an amount providing a molar ratio D/Fe with respect to the amount of the trivalent iron ion in the case where the substituting metal ion is not contained, or a molar ratio D/(Fe+M) with respect to the total amount of the trivalent iron ion and the ion of the metal M in the case where the substituting metal ion is contained of 0.125 or more and 1.0 or less;
a second neutralizing step of neutralizing the aqueous solution having the hydroxycarboxylic acid added thereto, to pH of 7.0 or more and 10.0 or less;
a step of coating a silicon oxide on iron oxyhydroxide or iron oxyhydroxide containing the substituting metal element formed in the second neutralizing step; and
a step of heating the iron oxyhydroxide or the iron oxyhydroxide containing the substituting metal element coated with a silicon oxide, so as to provide iron oxide or iron oxide containing the substituting metal element coated with a silicon oxide,
wherein $I_H$ represents an intensity of a peak present on a high magnetic field side in a differential B-H curve obtained by numerical differentiation of a B-H curve obtained by measuring under conditions of an applied magnetic field of 1,035 kA/m (13 kOe), an M measurement range of 0.005 A·m$^2$ (5 emu), a step bit of 80 bit, a time constant of 0.03 sec, and a wait time of 0.1 sec, and $I_L$ represents an intensity of an intercept of an ordinate at zero magnetic field in the differential B-H curve, and
$\alpha_s$ represents a maximum value of a diffraction intensity except for background in X-ray diffractometry at 2θ of 27.2° or more and 29.7° or less, and $\epsilon_s$ represents a maximum value of a diffraction intensity except for background in X-ray diffractometry at 2θ of 42° or more and 44° or less.

2. The method for producing an iron-based oxide magnetic particle powder according to claim 1, wherein the first neutralizing step to the second neutralizing step are performed at a temperature retained at 60° C. or less.

3. A method for producing an iron-based oxide magnetic particle powder containing $\epsilon$-Fe$_2$O$_3$, or $\epsilon$-Fe$_2$O$_3$, a part of Fe sites of which is substituted by another metal element M, having an average particle diameter measured with a transmission electron microscope of 10 nm or more and 30 nm or less, the iron-based oxide magnetic particle powder having a value of $I_L/I_H$ according to the following definition of 0.7 or less, and a value of $\alpha_s/\epsilon_s$ according to the following definition of 0.1 or less, the method comprising:
a first neutralizing step of neutralizing an aqueous solution containing a trivalent iron ion, or containing a trivalent iron ion and an ion of the metal M substituting a part of Fe sites to pH of 1.0 or more and 3.0 or less at a temperature retained at 5° C. or more and 25° C. or less;
a step of adding a hydroxycarboxylic acid D to the aqueous solution after the neutralization at a temperature retained at 5° C. or more and 25° C. or less in an amount providing a molar ratio D/Fe with respect to the amount of the trivalent iron ion in the case where the substituting metal ion is not contained, or a molar ratio D/(Fe+M) with respect to the total amount of the trivalent iron ion and the ion of the metal M in the case where the substituting metal ion is contained of 0.125 or more and 1.0 or less;
a second neutralizing step of neutralizing the aqueous solution having the hydroxycarboxylic acid added thereto, to pH of 7.0 or more and 10.0 or less at a temperature retained at 5° C. or more and 25° C. or less;
a step of coating a silicon oxide on iron oxyhydroxide or iron oxyhydroxide containing the substituting metal element formed in the second neutralizing step; and
a step of heating the iron oxyhydroxide or the iron oxyhydroxide containing the substituting metal element coated with a silicon oxide, so as to provide iron oxide or iron oxide containing the substituting metal element coated with a silicon oxide,
wherein $I_H$ represents an intensity of a peak present on a high magnetic field side in a differential B-H curve obtained by numerical differentiation of a B-H curve obtained by measuring under conditions of an applied magnetic field of 1,035 kA/m (13 kOe), an M measurement range of 0.005 A·m$^2$ (5 emu), a step bit of 80 bit, a time constant of 0.03 sec, and a wait time of 0.1 sec, and $I_L$ represents an intensity of an intercept of an ordinate at zero magnetic field in the differential B-H curve, and
$\alpha_s$ represents a maximum value of a diffraction intensity except for background in X-ray diffractometry at 2θ of 27.2° or more and 29.7° or less, and $\epsilon_s$ represents a maximum value of a diffraction intensity except for background in X-ray diffractometry at 2θ of 42° or more and 44° or less.

4. The method for producing an iron-based oxide magnetic particle powder according to claim 1, wherein the method further comprises a step of removing the silicon oxide coated on the iron oxide or the iron oxide containing the substituting metal element.

5. The method for producing an iron-based oxide magnetic particle powder according to claim 3, wherein the method further comprises a step of removing the silicon oxide coated on the iron oxide or the iron oxide containing the substituting metal element.

6. The method for producing iron-based oxide magnetic particle powder according to claim 1, wherein the iron-based oxide is $\varepsilon\text{-}A_xB_yC_zFe_{2-x-y-z}O_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and $0 \leq x, y, z < 1$).

7. The method for producing iron-based oxide magnetic particle powder according to claim 1, wherein the hydroxycarboxylic acid D is one or more selected from tartaric acid, citric acid, and malic acid.

* * * * *